United States Patent [19]
Wasserman

[11] Patent Number: 4,876,832
[45] Date of Patent: Oct. 31, 1989

[54] WALKING POWER MOWER ENCLOSURE

[76] Inventor: Ervin W. Wasserman, 1515 Seward, Roselle, Ill. 60172

[21] Appl. No.: 46,704

[22] Filed: May 7, 1987

[51] Int. Cl.⁴ ............................................... E04H 6/02
[52] U.S. Cl. .................... 52/79.1; 52/169.9; 52/DIG. 14
[58] Field of Search ............. 52/DIG. 14, 169.9, 79.9, 52/79.13, 79.1, 80; 135/115, 88; 150/52 K, 52 R

[56] References Cited

U.S. PATENT DOCUMENTS

| | | | |
|---|---|---|---|
| 479,942 | 8/1892 | Holladay | 119/19 |
| 2,311,514 | 2/1943 | Bramblett | 150/52 K |
| 2,820,990 | 1/1958 | Johnson | 52/80 |
| 3,087,585 | 4/1963 | Knuth et al. | 52/86 |
| 3,172,392 | 3/1965 | Schultz | 52/80 |
| 3,284,969 | 11/1966 | Walters et al. | 52/80 |
| 3,431,922 | 3/1969 | Kilbride | 135/88 |
| 3,474,803 | 10/1969 | Davis | 135/102 |
| 3,763,608 | 10/1973 | Chamlee | 52/80 |
| 3,802,133 | 4/1974 | Gregory | 52/80 |
| 3,949,528 | 4/1976 | Hartger et al. | 52/79.1 |
| 4,132,257 | 1/1979 | Filosa | 150/52 R |
| 4,178,977 | 12/1979 | Sur et al. | 135/88 |
| 4,306,390 | 12/1981 | Brown | 52/DIG. 14 |
| 4,673,227 | 6/1987 | Anderson | 312/100 |

FOREIGN PATENT DOCUMENTS

| | | | |
|---|---|---|---|
| 815100 | 8/1951 | Fed. Rep. of Germany | 52/DIG. 14 |
| 643994 | 9/1928 | France | 52/DIG. 14 |
| 2424389 | 12/1979 | France | 52/79.1 |
| 238101 | 11/1945 | Switzerland | 52/DIG. 14 |
| 528355 | 11/1972 | Switzerland | 52/79.1 |
| 864958 | 4/1961 | United Kingdom | 150/52 K |

Primary Examiner—Michael Safavi

[57] ABSTRACT

A user assembled enclosure for walking mowers having a generally rectangular housing with an open front end and no bottom wall, with the housing being attached to the ground with a cross strap and stake, the foward end of the housing partly closable with a door pivoted to the housing, and a flexible canvas cover for the mower handle.

2 Claims, 3 Drawing Sheets

WALKING POWER MOWER ENCLOSURE

BACKGROUND OF THE INVENTION

There have in the past been attempts to design and construct enclosures for lawn care devices such as lawn mowers and garden tractors. These attempts, however, are mostly limited to shed-type enclosures that are large enough for operator, as well as equipment entry. Such sheds, however, are difficult to install for may people and are further beyond the affordability of many homeowners and renters that care for their own lawn yet have a desire to protect their lawn mower from the elements as well as vandalism.

There have also been a few attempts to manufacture small enclosures for lawn mowers that enclose only the lawn mower itself. There prior lawn mower enclosures have been almost solely portable enclosures that usually require the user to lift them away from the lawn mower for use. The disadvantage with such enclosures is that they are difficult to lift and subject to theft because they are usually left outdoors for long periods of time unattended.

Examples of these small lawn mower enclosures are found in the Knuth, et al., U.S. Pat. No. 3,087,585 and the Sur, et al., U.S. Pat. No. 4,178,977. Knuth, et al. show a flexible front apron constructed of rubber and slitted having holes to accommodate the mower handle. It is necessary in the Knuth cover to remove the entire cover from the mower to get the mower out of the cover. Such a construction would not be operable if permanently affixed to the ground. The Sur. et al. cover consists of two plastic shells that can be adjusted to fit over different sized lawn mowers. It appears that the Sur, et al. cover is also not designed to be affixed to the ground because it must be lifted upwardly for removal of the mower.

While not believed directly relevant to lawn mower enclosures, the Hartger, et al., U.S. Pat. No. 3,949,528 shows a bike, motorcycle, snowmobile, molded plastic shed having a pivotal door that permits entrance and egress relative to a module. The Hartger construction encloses the entire vehicle.

Several other patents have been found that show various types of covers with locks, namely; Holladay, U.S. Pat. No. 479,942; Bramblett, U.S. Pat. No. 2,311,514, Davis, U.S. Pat. No. 3,474,803, and British Patent Specification No. 864,958, published Apr. 12, 1961.

SUMMARY OF THE PRESENT INVENTION

In accordance with the present invention, a lawn mower enclosure is provided that includes a one-piece rigid housing that is permanently attached to the ground with non-removable stakes, a pivotal door on the front of the housing that permits the mower deck to be rolled in and out of the housing in a very simple fashion, and a flexible cover that encloses only the handle that is releasably connected to the housing so that the entire mower is protected from the elements. The present enclosure provides the security and protection from vandalism not found in prior enclosures and at the same time is much easier to use because the rigid housing does not have to be moved to effect removal or entry of the mower relative to the housing.

An important aspect of the present invention is that the enclosure can be easily user assembled and installed in the yard. Toward this end the present housing includes spaced sidewalls, a rear wall and a top wall but has no front wall and no bottom or floor. An important advantage to this construction is that it permits the housings to be stacked for shipment and display at the retail location without requiring great amounts of storage space that would be required if the housing has a bottom wall.

a metal cross strap is provided in the enclosure assembly that the user permanently stakes to the ground prior to attaching the housing to the strap. This permits the stake to be located inside the housing where it cannot easily be removed by vandals. The cross strap also assists in rigidifying the housing.

The forward ends of the side walls have pivot bosses that receive pins that form a pivotal connection with similar bosses carried by the pivotal front door, which lays on the ground in its open position and onlu partly closes the front forward opening in the housing in its closed position to accommodate the mower handle which projects from the housing through the remaining opening. The spacing between the pivot bosses is simply adjustable by the user with additional ground engaging stakes at the forward end of the side walls that enable the user to space the side walls properly to accommodate the pivot bosses on the door.

The handle is enclosed by a flexible canvas cover having a single open end with a plurality of eyelets that can be placed over a plurality of hooks around the perimeter of the forward end of the housing. several sets of these eyelets are provided on the cover so that the user can adjust the cover to the length and angle of the handle on the particular walking mower.

A further feature of the present invention is the provision of cooperating locking tabs on the upper end of the door and the top wall of the housing that can receive one or two padlocks to provide security for the mower itself when in the housing.

Other features and advantages of the present invention will appear from the detailed description of the invention set forth below.

DETAILED DESCRIPTION OF THE PREFERRED EMBODIMENT

Figure 1:
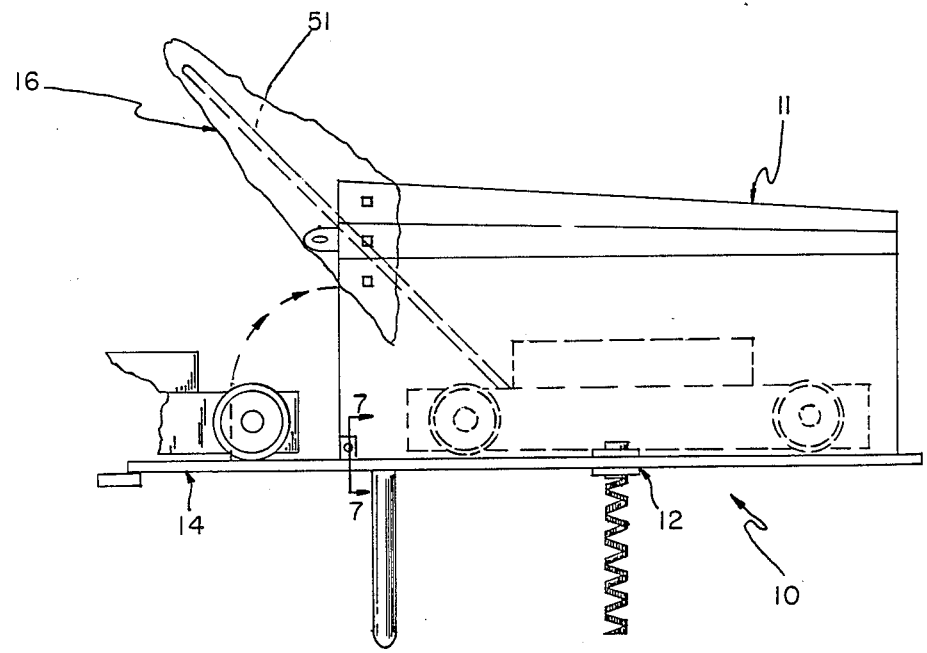
FIG. 1 is a right side view of a walking power mower enclosure according to the invention with the forward door in its open position.
Figure 2:
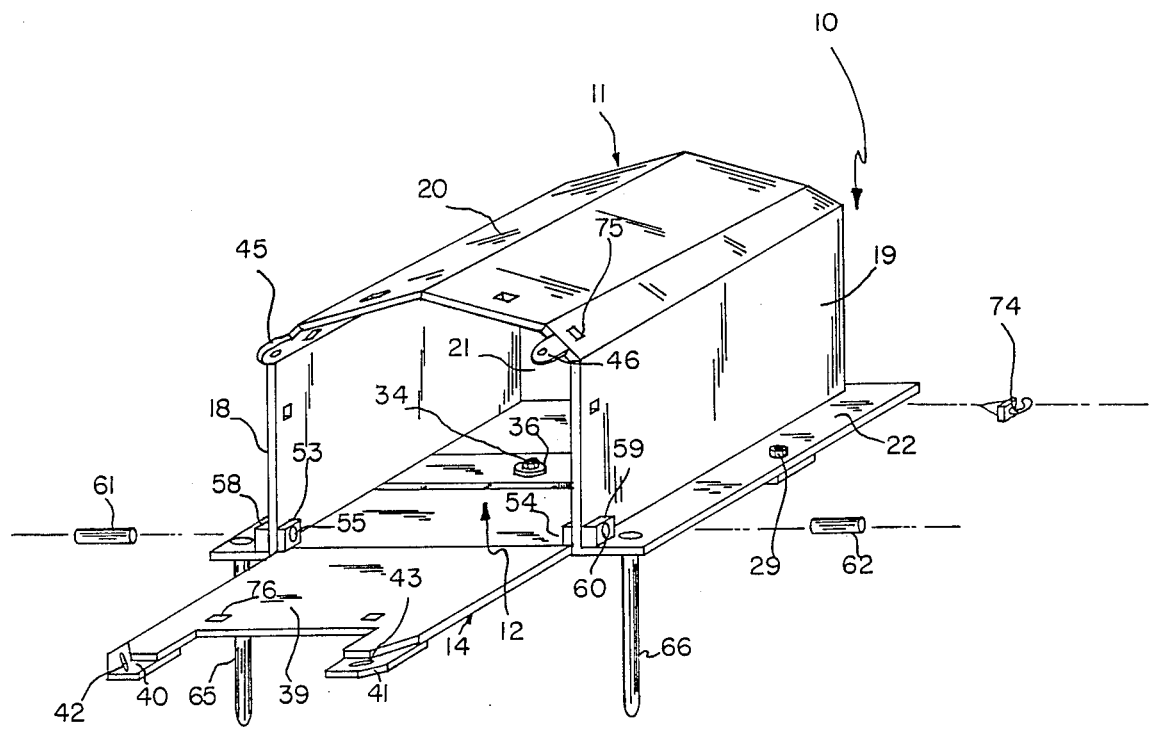
FIG. 2 is a perspective view of the housing and pivotal door of the present walking power mower enclosure illustrating the metal attaching strap, and with the door in its open position, and with an exemplary cover hook and pivot pins shown in exploded form.

Referring to the drawings, particularly FIGS. 1 and 2, a walking mower enclosure assembly 10 is illustrated consisting generally of a one-piece generally rectangular rigid housing 11 permanently fastened to the ground by a strap assembly 12, a pivotal front door 14 selectively closing part of the front end of housing 11, and a canvas handle enclosure 16 that is releasably connected to the housing 11.

Housing 11 is a one-piece plastic injection molding constructed of a durable high impact strength plastic such as polypropylene. Housing 11 includes spaced parallel side walls 18 and 19, a slightly axially tapered multi-faceted top wall 20, a rear wall 21 and a horizontal peripheral flange 22 extending along the bottom of side walls 18 and 19 and rear wall 21.

Because the housing 11 has no bottom wall and no front wall, it can be easily stacked with other housings for shipment and display without consuming large amounts of storage space.

The strap assembly 12 illustrated in FIGS. 1, 2, 3 and 6 is user-assembled and installed and seen to include a metal cross strap 24 having apertures 25 and 26 that receive fasteners 27 and 28 that with nuts 29 attach the strap to the flange 22 at both side walls 18 and 19, and a central aperture 30 that receives a fastener 31 welded to a spiral metal stake 32.

The assembly 12 is shipped completely disassembled and separate from the housing 11. The user in assembly initially drives spiral stake 32 into the ground using nut 34 (FIG. 2) threaded on fastener 31 and he rotates the stake into the ground with a wrench, such as a box or socket wrench. Nut 34 is then removed from fastener 31 and strap 24 placed over the fastener 31. Washer 36 is then placed over fastener 31 and nut 34 threaded down and tightened clamping washer 36 against strap 24 thereby permanently affixing the strap 24 to the ground with fasteners 27 and 28 already placed in holes 25 and 26 perspectively. The housing 11 is then placed over the upwardly projecting fasteners 27 and 28 and non-removable nuts 29 are then threaded over fasteners 27 and 28 thereby permanently attaching the housing 11 to the ground in very simple fashion.

Figure 4:
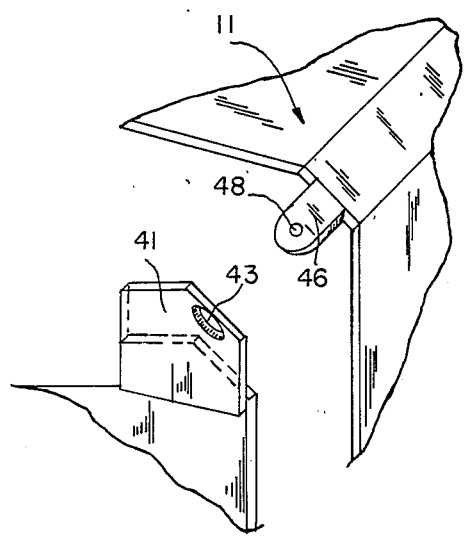
FIG. 4 is a fragmentary perspective of the door and housing with the door in a partly closed position illustrating the locking tabs.
Figure 5:
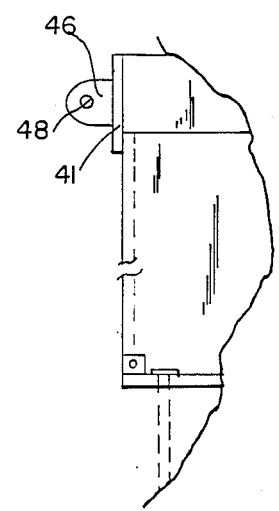
FIG. 5 is a fragmentary side view of the housing and door of the present walking power mower enclosure with the door illustrated in its closed position over one of the housing locking tabs.
Figure 6:
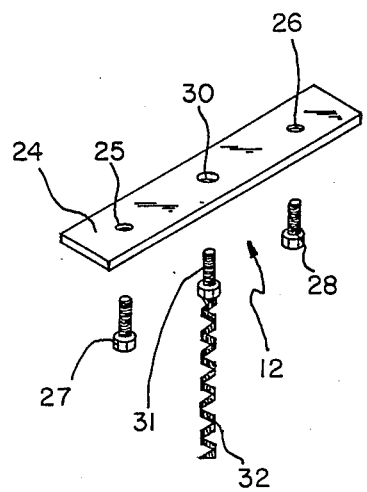
FIG. 6 is a perspective sub-assembly of the metal cross strap of the present walking power mower enclosure.

The door 14 is a one-piece injection molding constructed of similar material to the housing 11 and is seen to include a generally rectangular panel 39 with upwardly projecting spaced offset ears 40 and 41 that have slots 42 and 43 therein that fit over slotted tangs 45 and 46 projecting forwardly from housing top wall 20. As seen more clearly in FIGS. 4 and 5, the slotted tangs 45 and 46 have apertures 48 either or both of which can receive a padlock for the purpose of locking door 14 in its closed position.

Figure 3:
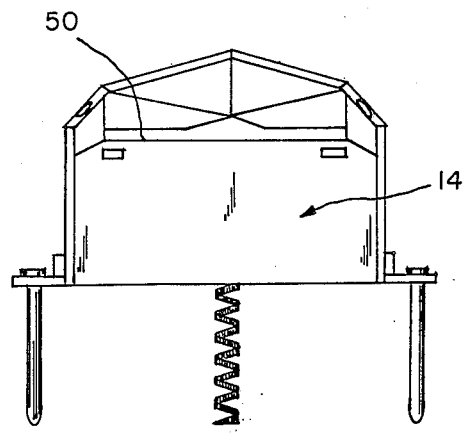
FIG. 3 is a front view of the housing and door assembly of the present walking power mower enclosure with the door shown in its closed position.

As seen more clearly in FIG. 3, door 14 has an opening 50 through which mower handle 51 (FIG. 1) may project.

Figure 7:
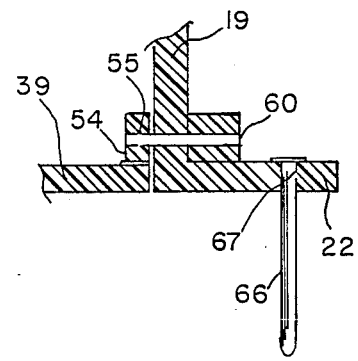
FIG. 7 is a fragmentary section taken generally along line 7—7 of FIG. 1.

As seen in FIGS. 1, 2 and 7, the lower end of the door panel 39 has a pair of integral spaced bases 53 and 54 that have transverse through bores 55 therein. The side walls 18 and 19 and flange 20 have integral bosses 58 and 59 at the forward lower ends thereof with transverse through bores 60 therethrough that receive pivot pins 61 and 62 that extend into the door boss bores 55 to pivotally mount the door 14 at the forward lower end of housing 11.

Since the housing 11 does not have either a bottom wall or a front wall, the spacing between the bosses 53 and 54 is somewhat indeterminant before assembly because the side walls 18 and 19 near the front of the housing are somewhat flexible. Therefore, the present assembly enables the user to adjust and fix the spacing between the bosses 58 and 59 so that the door panel bosses 53 and 54 fit closely but freely against the inside surfaces of the side walls 18 and 19.

To achieve this, the user before or after attachment of the housing 11 to the strap assembly 12, attaches door 14 to the bosses 58 and 59 by inserting pins 61 and 62 therethrough. After attaching housing 11 into strap assembly 12, one of the ground engaging stakes 65 and 66 is driven through one of the apertures 67 in flange 22 at its forward end adjacent to bosses 58 and 59. Then the opposite or free one of the bosses 58, 59 is pushed transversely until the insides of side walls 18 and 19 engage the door bosses 53 and 54 and then the remaining stake 65, 66 is driven through the other aperture 67 fixing the spacing between the forward end of the side walls and properly locating the pivotal connections between the door 14 and the housing 11.

The stakes 65 and 66, in addition to properly locating the distance between bases 53 and 54 and the housing side walls also lock the forward end of the housing 11 to the ground to give it rotational stability about a vertical axis.

Figure 8:
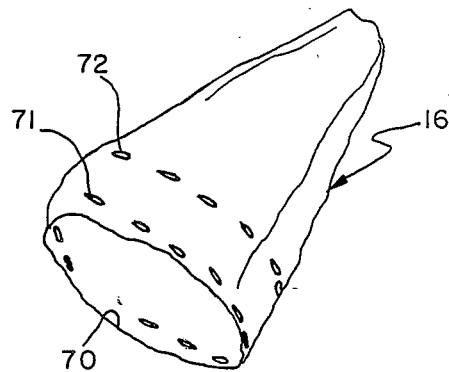
FIG. 8 is a sub-assembly view of the handle cover illustrated in FIG. 1.

The canvas handle enclosure 16 is illustrated in FIGS. 1 and 8 and is seen to be generally cup-shaped in configuration having a single open end 70 and a plurality of axially spaced sets of metal eyelets 71 and 72 that fit over and lock on hooks 74 (shown exploded in FIG. 2) permanently attached to apertures 75 surrounding the forward end of the housing 11 and apertures 76 in the upper end of the door panel 39 to completely enclose handle 51 and seal it to the housing 11. The axially spaced sets of eyelets 71 and 72 on handle enclosure 16 permit the enclosure 16 to be adjusted axially on handle 51 to accommodate a variety of lengths and angles of walking mower handles.

I claim:

1. An enclosure for a walking mower that my be easily user installed, comprising: a one-piece housing having spaced side walls, a rear wall and a top wall with an open front and without a bottom wall, a ground engaging cross member separate from the housing, means for attaching the crosss member to the ground prior to the attachment of the housing, means to attach the housing to the cross member after the cross member is attached to the ground, a door pivotally connected to the side walls positioned to at least partly close the open front of the housing, and means for the user to easily adjust the spacing between the side walls so the pivotal connection between the door and the side walls is properly maintained.

2. An enclosure for walking mowers, as defined in claim 1, wherein the pivotal connection between the door and the side walls include pins extending transversely through a front portion of the walls into the door, said means for the user to easily adjust the spacing between the side walls including stake means extending through the side walls into the gound.

* * * * *